United States Patent
Yonetsu et al.

(10) Patent No.: US 6,825,424 B2
(45) Date of Patent: Nov. 30, 2004

(54) COMBINATION WEIGHING APPARATUS

(75) Inventors: Michihiko Yonetsu, Ritto (JP); Hiroe Konishi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 183 days.

(21) Appl. No.: 10/305,129

(22) Filed: Nov. 27, 2002

(65) Prior Publication Data

US 2003/0111274 A1 Jun. 19, 2003

(30) Foreign Application Priority Data

Dec. 13, 2001 (JP) .......................................... 2001-379475
Dec. 13, 2001 (JP) .......................................... 2001-379541

(51) Int. Cl.⁷ .......................................... G01G 19/387
(52) U.S. Cl. ................................. 177/25.18
(58) Field of Search ............................ 222/504, 556; 177/25.18

(56) References Cited

U.S. PATENT DOCUMENTS

| | | | | |
|---|---|---|---|---|
| 4,522,321 A | * | 6/1985 | Kinoshita | 222/504 |
| 4,635,831 A | * | 1/1987 | Kinoshita | 222/504 |
| 4,705,125 A | * | 11/1987 | Yamada et al. | 177/25.18 |
| 4,874,048 A | * | 10/1989 | Kawanishi et al. | 177/25.18 |
| 6,622,894 B2 | * | 9/2003 | Matsunaga et al. | 222/504 |

FOREIGN PATENT DOCUMENTS

JP          07-198465          8/1995

* cited by examiner

*Primary Examiner*—Randy W. Gibson
(74) *Attorney, Agent, or Firm*—Staas & Halsey LLP

(57) ABSTRACT

A combination weighing apparatus includes a plurality of hoppers each having a gate and being capable of accommodating an article and discharging the article therefrom upon opening of the respective gate, a drive device for selectively opening and closing the gate and maintaining the gate in an opened position when in a conducting state, and a control device for controlling the drive device and having a weighing mode, in which the gates of the hoppers selected for combination are opened to combine the respective articles, and a discharge mode in which the articles within the hoppers are discharged while the gates are maintained in the opened position. The control device performs a control of closing the gate when during the discharge mode the opening of the gate lasts a predetermined length of time. The control device also performs a control of setting a closing duration of the gate during the discharge mode to a value longer than a closing duration of the gate during the weighing mode.

19 Claims, 10 Drawing Sheets

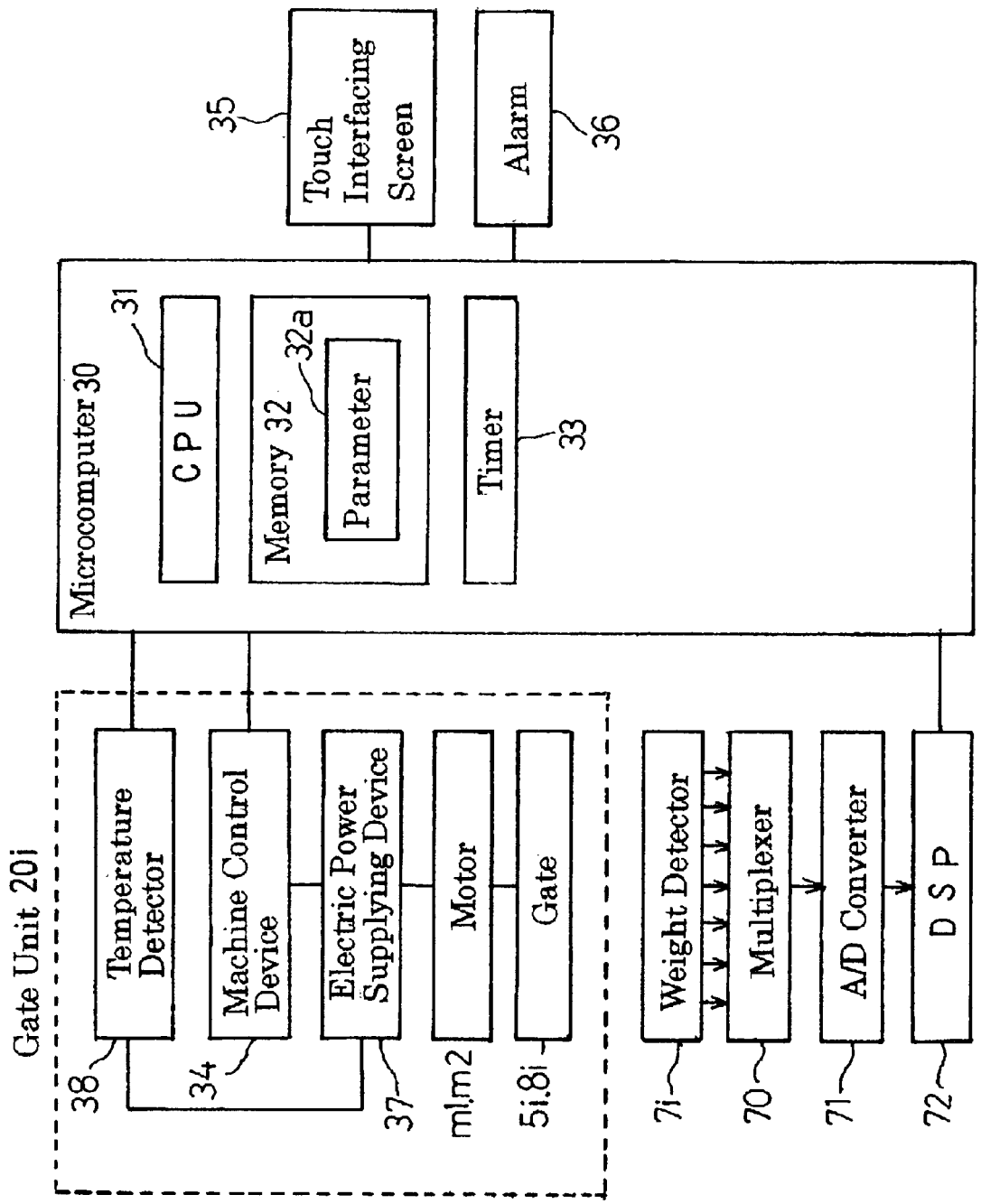

Fig. 5B

Parameter Storage 32a

| Modes | Gate Closing Duration | Motor Rotational Speed |
|---|---|---|
| Weighing Mode | 0.5 sec | 360° / sec |
| Discharge Mode | 40.0 sec | 4.5° / sec |

Select Menu 40

Closing Duration Setting Submenu 41

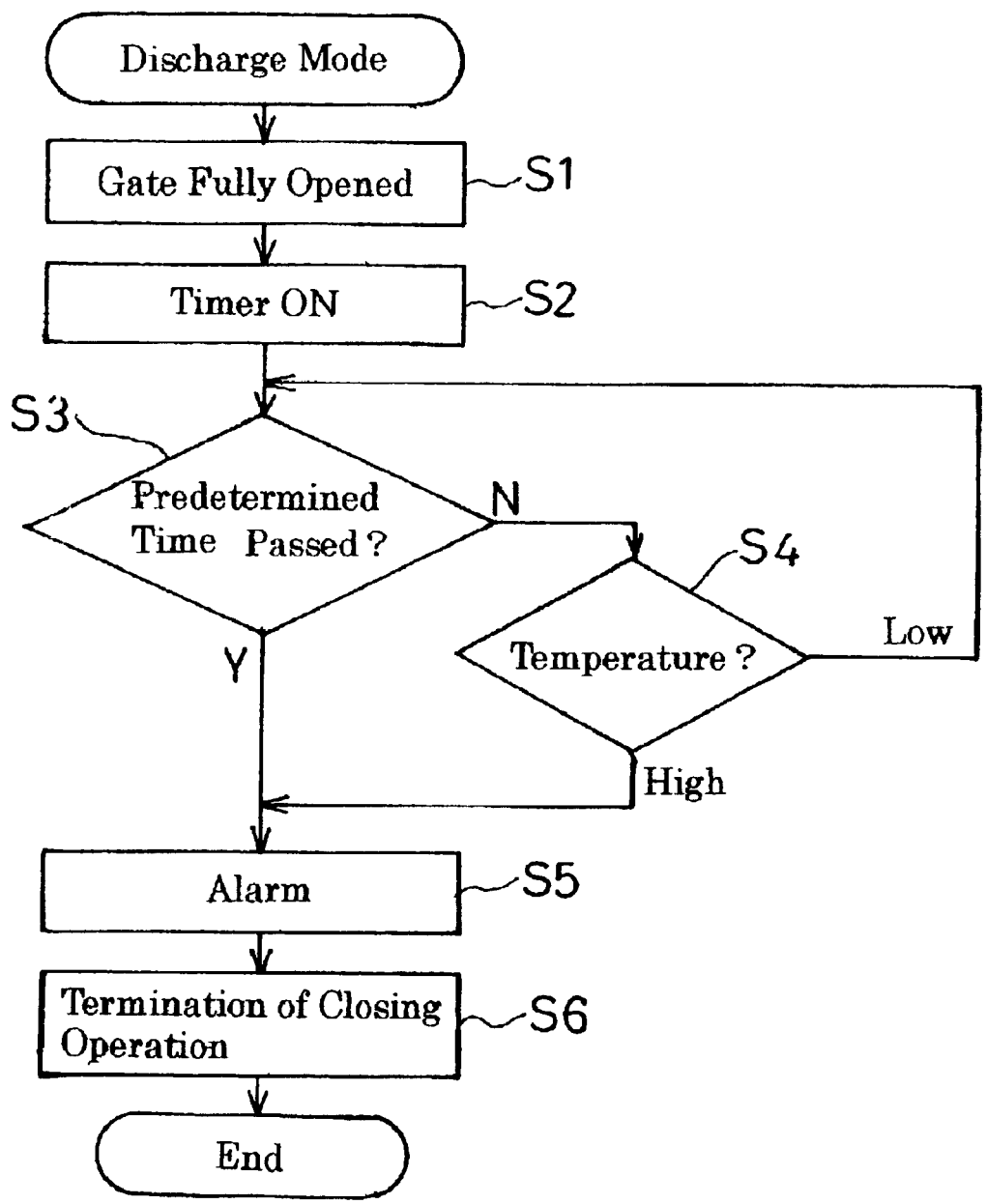

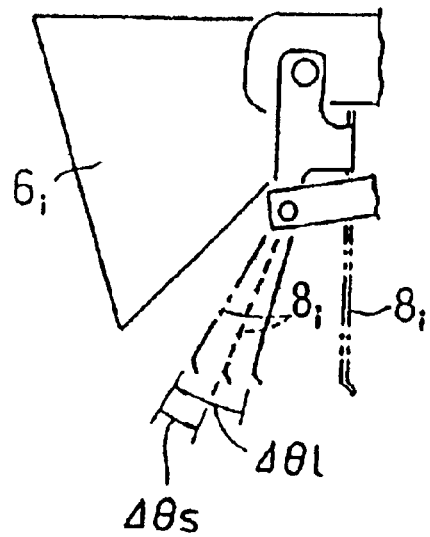

COMBINATION WEIGHING APPARATUS

BACKGROUND OF THE INVENTION

1. Field of the Invention

The present invention relates to a combination weighing apparatus equipped with a plurality of weighing hoppers.

2. Description of the Prior Art

The combination weighing apparatus generally includes a plurality of weighing hoppers and is designed to select one or a combination of those weighing hoppers so as to measure an intended or required weight of articles accommodated within such one or a combination of those weighing hoppers. This type of the combination weighing apparatus also includes, in addition to the weighing hoppers, a dispensing feeder and pooling hoppers. In such combination weighing apparatus, at the time of a setup operation in which the articles being handled are changed from one kind to another or at the time of cleansing, the articles remaining within the dispensing feeder, the pooling hoppers and the weighing hoppers have to be removed or discharged out of the system. Also, it often occurs that the weighing hoppers are cleansed when the necessity arises.

In such cases, each of the hoppers are kept open to allow removal or discharge of the articles by continuously supplying an electric power to electric motors each used to open the respective hoppers. If the hoppers are kept open for a substantial length of time, the motors tend to heat up, resulting in damages to the motors.

On the other hand, the combination weighing apparatus of the kind disclosed in the Japanese Laid-open Patent Publication No. 7-198465 employs a link mechanism for opening and closing hoppers so that while the link mechanism keeps the hoppers in a fully opened position, the supply of an electric power to the electric motors is interrupted so long as the hoppers are kept in the fully opened position. However, since according to the above mentioned publication the hoppers can be kept in the fully opened position by means of the link mechanism, the link mechanism is necessarily complicated. Because of this, not only is the cost of manufacture of the apparatus high, but the complicated link mechanism tends to be contaminated with articles and/or foreign matter, resulting in complications in cleansing.

In such case, it may be contemplated to use a predetermined trigger to close a gate of each of the hoppers. However, it may occur that all of the gates of those hoppers are closed at a time by a trigger signal, surprising an operator.

SUMMARY OF THE INVENTION

In view of the foregoing, the present invention is intended to provide a combination weighing apparatus wherein electric motors are hardly damaged and link mechanism will not be complicated.

Another important object of the present invention is to provide a combination weighing apparatus of the type referred to above wherein even when the gates are abruptly closed during the setup operation or the cleansing operation, the operator will not be taken aback.

In order to accomplish the foregoing objects of the present invention, there is provided in accordance with a first aspect of the present invention a combination weighing apparatus which includes a plurality of hoppers each having a gate and being capable of accommodating an article and discharging it therefrom upon opening of the respective gate; a drive device for selectively opening and closing the gate and maintaining the gate in an opened position when in a conducting state; and a control device for controlling the drive device and having a weighing mode, in which the gates of the hoppers selected for combination are opened to combine the respective articles, and a discharge mode in which the articles within the hoppers are discharged while the gates are maintained in the opened position.

In this combination weighing apparatus of the present invention, when during the discharge mode a condition of at least one of the drive device, an electric power supplying device for supplying an electric power to the drive device and the gate reaches a setting level, said control device drives the drive device to control the gate to close.

According to the present invention, since when the condition of at least one of the drive device, the electric power supplying device for supplying an electric power to the drive device and the gate attains the setting level the gate is closed, the drive device for maintaining the gate in the opened position is brought into a non-conducting state after a predetermined length of time. Accordingly, it is possible to avoid any possible damage resulting from heat-up of the motors.

In a first preferred embodiment of the present invention, the combination weighing apparatus also includes a detecting device for detecting a driving condition of the drive device when the gate is opened, so that when a detected value detected by the detecting device during the discharge mode attains a predetermined value, said control device drives the drive device to control the gate to close.

According to this first preferred embodiment, since when the detected value detected by the detecting device attains the predetermined value the gate is closed, the drive device for maintaining the gate in the opened position is brought into a non-conducting state after a predetermined length of time. Accordingly, it is possible to avoid any possible damage resulting from heat-up of the motor.

In a second preferred embodiment of the present invention, the detecting device is employed in the form of a timer so that when an opened condition of the gate lasts a predetermined length of time during the discharge mode, the control device controls the gate to close.

According to the second embodiment described above, since the gate is closed after the predetermined length of time, the drive device for maintaining the gate in the opened position is brought into the non-conductive state after the predetermined length of time. Accordingly, damages which may be brought about by heat-up of the motor can be prevented.

It is to be noted that since when the drive device is brought into the conductive state the gate is maintained in the opened position, there is no possibility that the link mechanism may be complicated.

In a third preferred embodiment of the present invention, when during the discharge mode in which the gate is in the opened position, the temperature of the electric power supplying device for maintaining the gate in the opened position as a result of the conduction attains a predetermined temperature, the control device controls the gate to close.

In the present invention, the term "electric power supplying device" encompasses an electric power source circuit of the entire combination weighing apparatus and/or an electric power source circuit for motors used to selectively open and close the hoppers.

According to the third embodiment described above, since when the temperature of the electric power supplying device attains the predetermined temperature while the gate is in the fully opened position, the gate is closed, the drive device can be brought into a non-conductive state. Accordingly, as is the case with the first embodiment, damages which may be brought about by heat-up of the motor can be prevented.

In a fourth preferred embodiment of the present invention, when during the discharge mode in which the gate is in the opened position, a cumulative value of a driving current or an electric power of the electric power supplying device for maintaining the gate in the opened position as a result of the conduction attains a predetermined value, said control device controls the gate to close.

According to the fourth embodiment described above, since the gate is closed when the electric power or the driving current of the electric power supplying device attains the predetermined value with the drive device consequently brought into the non-conductive state, as is the case with the first embodiment damages which may be brought about by heat-up of the motor can be prevented.

n a preferred embodiment of the present invention, a sound source generates sounds upon the closing operation of the gate during the discharge mode, that is, before the closing operation of the gate and/or during the closing operation of the gate. This feature is advantageous in that since at the time of closure of the gate a precautious warning is available by means of sounds, an operator servicing the combination weighing apparatus can be informed beforehand or during the closing operation of the gate. Accordingly, the operator will not be taken aback at the time the gate is to be closed.

In another preferred embodiment of the present invention an average speed of closing of the gate during the discharge mode is controlled to a value lower than an average speed of closing of the gate during the weighing mode. Since the speed at which the gate is closed is low, the operator can quickly take necessary steps even when the gate is abruptly closed.

According to a second aspect of the present invention, there is provided a combination weighing apparatus which includes a plurality of hoppers each having a gate and accommodating an article and discharging it therefrom upon opening of the respective gate; a drive device for selectively opening and closing the gate and maintaining the gate in an opened position when in a conducting state; and a control device for controlling the drive device and having a weighing mode, in which the gates of the hoppers selected for combination are opened to combine the respective articles, and a discharge mode in which the articles within the hoppers are discharged while the gates are maintained in the opened position. In this combination weighing apparatus, the control device performs a control of setting a closing duration of the gate during the discharge mode to a value longer than a closing duration of the gate during the weighing mode.

According to this second aspect of the present invention, since during the discharge mode the closing duration in which the plural gates are closed all at a time is long, that is, the gates are closed at a low speed, it is possible to suppress the possibility of the operator being taken aback.

In a preferred embodiment of the present invention, during the discharge mode the gate is intermittently moved a number of times to cause the gate to undergo the closing operation, so that sounds can be generated each time the gate undergoes the intermittent movement. In other words, during the discharge mode in which the gate is undergoing the closing operation, by repeating an operation that discontinuously varies the speed of movement of the gate, the sounds can be generated each time the speed of movement of the gate varies discontinuously.

According to this feature, when the gate generates the sounds during closure of the gate, it is possible to suppress the possibility of the operator being taken aback which would otherwise occur when the gate closes abruptly.

In a further preferred embodiment of the present invention, the speed of movement of the gate being closed is chosen to be higher during the movement thereof than that at the time of termination of movement of the gate, so that the bigger sounds can be generated during the movement of the gate than at the time of termination of movement of the gate. According to this preferred embodiment, since the sound generated during the movement of the gate is big, not only can the closure of the gate be informed to the operator with no fault, but also unnecessary obnoxious sounds can be reduced since the volume of the sound generated at the time of termination of movement of the gate is small.

In a still further preferred embodiment of the present invention, the combination weighing apparatus further includes an input setting device for enabling at least one of driving parameters including a closing duration of the gate during the discharge mode, a speed of rotation of a drive source of the drive device and angle of rotation of the drive source to be inputted. According to this embodiment, inputting of the driving parameter allows the user to set the length of time and the volume of the sound to be generated at his or her will.

In such embodiment, the combination weighing apparatus preferably includes a select device for setting control patterns of at least two of a control of the gate closing duration by the control device during the discharge mode, a control of a speed of rotation of the drive source, a control of an angle of rotation of the drive source and a control of a speed of movement of the gate, and also for selecting one of the plural control patterns.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 5A is a conceptual diagram showing various functional parts of the combination weighing apparatus;

FIG. 5B is a chart showing a memory and contents stored therein;

FIG. 7 is a flowchart showing the sequence of a discharge mode;

FIG. 9A is a schematic side view of the hopper showing the manner of opening the gate thereof according to a further preferred embodiment of the present invention; and FIG. 9B is a schematic front elevational view showing a rotational angle setup screen.

DETAILED DESCRIPTION OF THE EMBODIMENTS

Hereinafter, preferred embodiments of the present invention will be described with reference to the accompanying drawings.

Overview:

In the first place, a combination weighing apparatus to which the present invention pertains will be described briefly.

Figure 1:
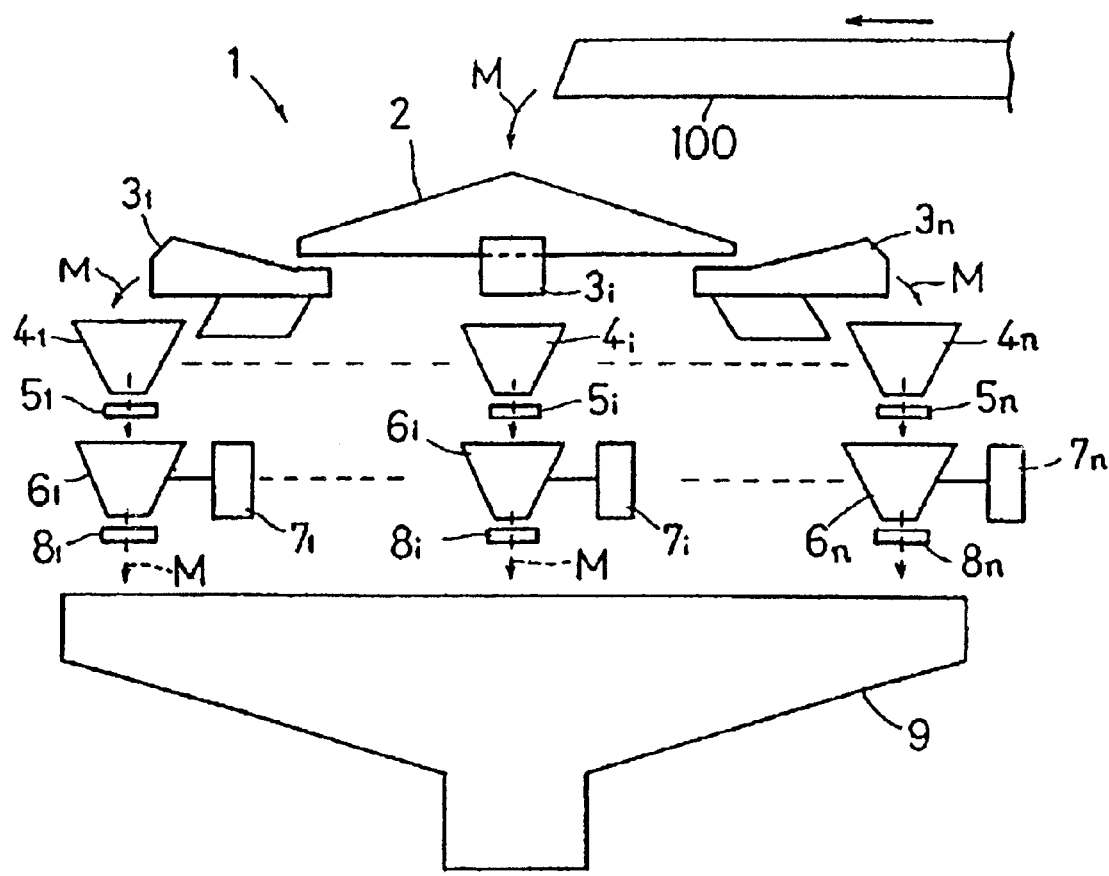
FIG. 1 is a conceptual diagram showing the function of a combination weighing apparatus according to the present invention.

As shown in FIG. 1, a transport conveyor 100 is employed to supply articles M that are goods to be weighed, so as to fall by the effect of gravity onto a dispensing feeder 2 generally in alignment with a vertex of the dispensing feeder 2. The articles M are, after having been collected to a predetermined quantity (weight), bagged in a bag to provide a product.

The dispensing feeder 2 and a plurality of supply troughs 3i are vibrated by respective vibrating mechanisms so that the articles M falling onto the dispensing feeder 2 can be supplied through the troughs 3i into a plurality of pooling hoppers 4i positioned immediately below the associated troughs 3i. Each of the pooling hoppers 4i is provided with a first gate 5i movable between fully opened and closed positions and operable to accommodate and store the articles M, received from the associated supply trough 3i, temporarily when the first gate 5i is in the closed position. Positioned downstream of and immediately below each of the pooling hoppers 4i is a weighing hopper 6i for receiving the articles M from the associated pooling hopper 4i when the first gate 5i is moved to the fully opened position as will be described later. The articles M supplied into each weighing hopper 6i is weighed by a corresponding weight detector 7i coupled therewith. Each of the weighing hoppers 6i has a lower portion provided with a second gate 8i movable between opened and closed positions and operable to accommodate and store the articles M, received from the associated pooling hopper 4i, temporarily when the second gate 8i is in the closed position.

Similarly, positioned downstream of and immediately below the respective second gates 8i of the weighing hoppers 6i is a large collecting and discharging chute 9 for receiving the articles M weighed within and discharged from some or all of the weighing hoppers 6i when the second gates 8i thereof are moved to the opened position, so that a combination of the articles M whose weights have been detected by the associated weight detectors 7i, the sum of which weights satisfies a target weight or a weight approximate to the target weight, can be supplied downstream towards a subsequent processing station.

Gate Switching Mechanism

Figure 2:
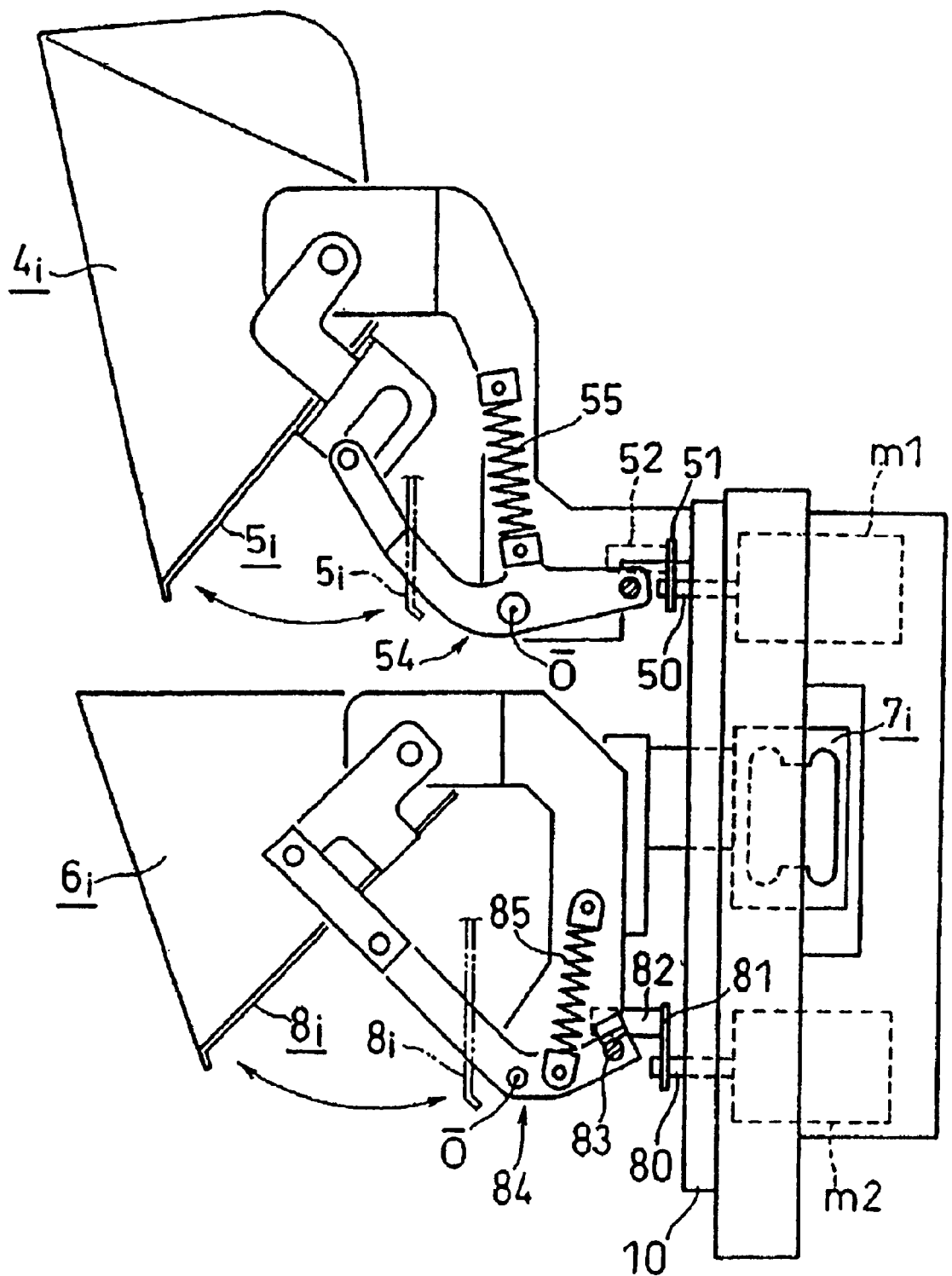
FIG. 2 is a side view of a hopper assembly according to a first preferred embodiment of the present invention.

FIG. 2 illustrates a side view showing one of the pooling hoppers 4i together with the associated weighing hopper 6i operatively coupled with such one of the pooling hoppers 4i. As shown in FIG. 2, the first gate 5i and the second gate 8i are provided with respective gate switching mechanisms 54 and 84 each having a link mechanism. Each of the gate switching mechanisms 54 and 84 includes respective coiled tension springs 55 and 85 and the first and second gates 5i and 8i are normally urged to the closed position by the action of the corresponding coiled tension springs 55 and 85.

Each of the gate switching mechanisms 54 and 84 includes a respective electric motor (drive source) m1 and m2 and drives the associated first or second gate 5i and 8i to move the latter from the closed position towards the opened position by means of a driving force from the corresponding drive source m1 and m2. Each of the electric motors m1 and m2 is employed in the form of, for example, a stepper motor and is fixed to a machine frame structure 10. The electric motors m1 and m2 have output shafts 50 and 80 coupled fixedly at a free end thereof with corresponding first and second arms 51 and 81, respectively. Drive shafts 52 and 82 are fixedly mounted on each end of the respective first and second arms 51 and 81 so as to extend parallel to the corresponding output shafts 50 and 80. It is to be noted that each of the gate switching mechanisms 54 and 84 and the associated electric motor m1 and m2 altogether constitute a drive unit. It is also to be noted that each of the weighing hoppers 6i is provided with the corresponding weight detector 7i that supports the respective weight hopper 6i and detects the weight of the articles M within such weighing hopper 6i.

Gate Opening

Hereinafter, the manner in which the gate is selectively opened and closed will now be briefly described with reference to FIGS. 3A to 3F. It is to be noted that FIGS. 3B, 3D and 3F are fragmentary front elevational view showing, on an enlarged scale, the second drive shaft 82 and a driven shaft 83 associated therewith.

Figure 3A:
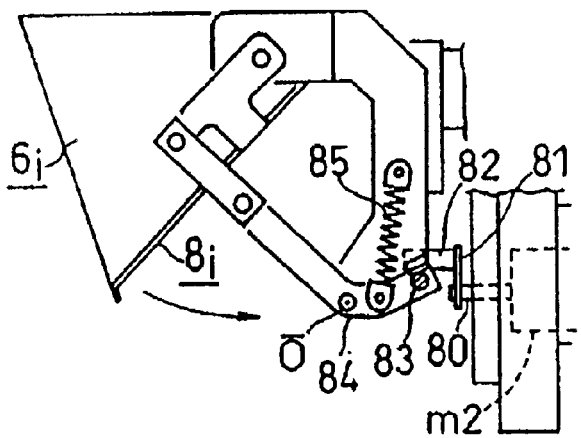
FIGS. 3A, 3C and 3E are fragmentary side views of one of the hoppers showing the manner of opening and closing a gate employed in the respective hopper.
Figure 3B:
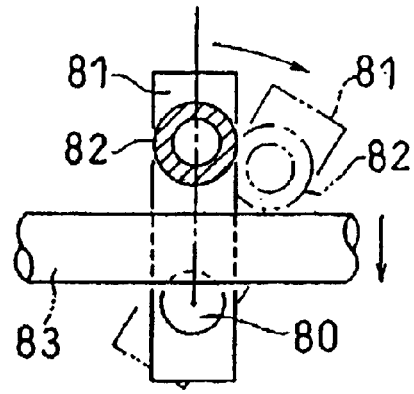
FIGS. 3B, 3D and 3F are fragmentary front elevational view of the hopper, showing the manner of opening and closing the gate employed therein in timed relation with that shown in FIGS. 3A, 3C and 3E, respectively.

In a condition in which the second gate 8i is held in the closed position as shown by the solid line in FIG. 3A, the second drive shaft 82 is clear from and does not contact the driven shaft 83 as shown by the solid line in FIG. 3B and, therefore, the second gate 8i is held in contact with a lower end of the weighing hopper 6i and is, hence, held in the closed position by the action of a spring force of the tension spring 85.

As the second drive shaft 82 rotates about the output shaft 80 from an initial position shown by the solid line, the second drive shaft 82 is brought into engagement with the driven shaft 83 and urges the driven shaft 83 downwardly to cause the link of the associated gate switching mechanism 84 to rotate about an axis of rotation O, accompanied by movement of the second gate 8i from the closed position towards the opened position as shown by the arrow in FIG. 3A. As shown by the solid line in FIGS. 3C and 3D, rotation of the drive shaft 82 about the output shaft 80 through 180° results in the driven shaft 83 brought to the lowest position to thereby fully open the second gate 8i.

Gate Closure

Assuming that the second gate 8i is in the fully opened position, clockwise rotation of the drive shaft 82 about the output shaft 80 allows the driven shaft 83 to be pulled upwardly by the action of the spring force of the tension spring 85 so that the second gate 8i is consequently moved toward the closed position. When the driven shaft 83 is shifted upwardly as a result of further clockwise rotation of the drive shaft 82 about the output shaft 80, the second gate 8i is brought into contact with the lower end of the weighing hopper 8i to close the latter as shown in FIGS. 3E and 3F and, at the same time, the driven shaft 83 is brought to a halt without being further shifted upwardly. However, the drive shaft 82 further rotates while disengaging from the driven shaft 83 and finally returns to the initial position as shown by the phantom line in FIG. 3E Thus, one complete rotation of the drive shaft 82 results in up and down movement of the drive shaft 83 to close and open the second gate 8i, respectively.

Gate Drive Speed

Figure 4A:
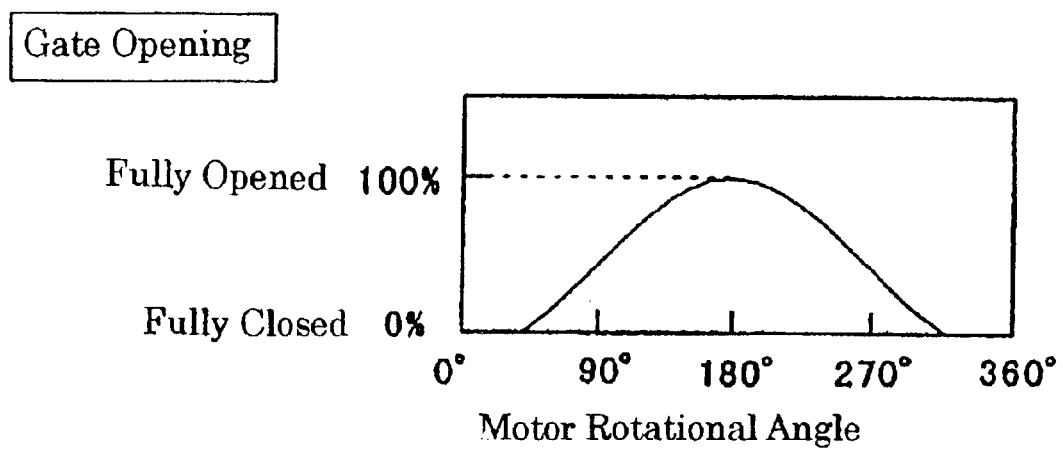
FIG. 4A is a graph showing the relationship between the angle of rotation of a drive source and the opening of the gate.

As discussed above, the driven shaft 83 moves up and down in response to one complete rotation of the drive shaft 82. The speed at which the driven shaft 83 moves in response to rotation of the drive shaft 82 varies depending on the position of the driven shaft 83 relative to the drive shaft 82. Specifically, the speed of movement of the driven shaft 83 is higher during a constant downward and upward movement of the driven shaft 83 than at the time of start of the downward movement, at the time near the lowest position and near completion of an upward movement. In other words, the drive shaft 82 and the driven shaft 83 constitute a sort of a cam mechanism and, accordingly, when the drive shaft 82 is rotated at a predetermined speed about the output shaft 80, change of the opening of the gate 8i is larger during the constant opening and closing movement of the gate 8i than during the movement of the gate 8i near the opened or closed positions as shown in FIG. 4A.

It is to be noted that although the foregoing description is made in connection with the second gate 8i of each of the weighing hoppers 6i, it equally applies to the first gate 5i of each of the pooling hoppers 4i and, therefore, the description of the operation of the first gate 5i will not be made for the sake of brevity.

Control Mechanism

As shown in FIG. 5A, each of the weight detectors 7i is electrically connected with a microcomputer (control unit) 30 through a multiplexer 70, an analog-to-digital (A/D) converter 71 and a DSP (digital signal processor) 72. The microcomputer 30 is in turn electrically connected with a machine control device 34, a temperature detector (an example of detecting devices) 38, a touch interfacing screen 35 and an alarm (a second sound source) 36.

The machine control device 34 referred to above is electrically connected with an electric power supplying device 37 which is in turn electrically connected with the electric motors m1 and m2. This machine control device 34 is operable to control the electric power supplying device 37 to thereby control the electric motors m1 and m2.

The electric power supplying device 37 when controlled by the machine control device 34 supplies an electric current, for example, a direct current to the motors m1 and m2. This electric power supplying device 37 is constructed of an electric power source circuit and performs, for example, a conversion from an alternating current to a direct current and a frequency conversion. It is to be noted that even the other electronic and electric equipments are supplied an electric power from other associated electric power supplying devices that are not shown.

The temperature detector 38 may be in the form of, for example, a temperature sensor or a temperature switch and is positioned in the vicinity of a capacitor of the electric power supplying device 37 for detecting the temperature of the electric power supplying device 37 so that a temperature signal indicative of the temperature so detected can be supplied to the microcomputer 30.

It is to be noted that in the combination weighing apparatus of the present invention, the machine control device 34, the electric power supplying device 37, the temperature detector 38, the electric motors m1 and m2 and the gates 5i and 8i are combined to construct a gate unit 20i which is in practice employed in a plural number (n).

The microcomputer 30 referred to above includes a central processing unit (CPU) 31, a memory 32 and a timer (another example of the detecting devices) 33 for counting time. The CPU 31 has a weighing mode and a discharge mode. During the weighing mode, the CPU 31 performs such a control as to combine weights of the articles M on the basis of the weights detected by the weight detectors 7i. The machine control device 34 controls the first and second electric motors m1 and m2 on the basis of such combination so that the second gates 8i of some or all of the weighing hoppers 6i that have been selected for the combination can be opened to allow the articles within those weighing hoppers 6i to be discharged downstream by the effect of gravity to thereby combine those articles together.

On the other hand, during the discharge mode, the CPU 31 causes the first and second gates 5i and 8i to be moved to and maintained at the fully opened position to allow the articles within the pooling and weighing hoppers 4i and 6i to be discharged therefrom and, also, maintains the first and second gates 5i and 8i at the fully opened positions, even when the supply troughs 3i positioned thereabove are being driven, to allow the articles to successively pass through the pooling and weighing hoppers 4i and 6i without being stagnated within such pooling and weighing hoppers 4i and 6i. In other words, during the discharge mode, the articles remaining in the combination weighing apparatus are all discharged through the weighing hoppers 6i.

The respective output shafts 50 and 80 (FIG. 3) of the electric motors m1 and m2, when a predetermined control signal (a rotation command) is supplied thereto from the machine control device 34, rotate a predetermined minute angle $\Delta\theta$, for example, 0.9° in response to the control signal and, by repeating rotation of this minute angle $\Delta\theta$, the output shafts 50 and 80 undergo 180° rotation to open the gates 5i and 8i and further 180° rotation to close the gates 5i and 8i.

On the other hand, in the event that the control signal referred to above is not inputted to the electric motors m1 and m2, without the magnetic polarity being changed, the electric motors m1 and m2 are halted while such angle of rotation of the drive shafts 50 and 80 are maintained.

As hereinbefore described, the gates 5i and 8i are normally held in the closed position by the action of the tension springs 55 and 85, respectively. Accordingly, in order to maintain the gates 5i and 8i in the fully opened position, a conductive state of the electric power supplying device 37 is kept with no rotation command outputted. In this way, the output shafts 50 and 80 can be held in a condition in which rotation thereof is halted and, hence, the gates can be held in the fully opened position. In such case, since the electric motors m1 and m2 must exert respective forces sufficient to overcome the biasing forces of the tension springs 55 and 85, respectively to retain the gates 5i and 8i in the opened position, the electric motors m1 and m2 tend to be loaded and a relatively large current flows. Consequently upon flow of such excessive current, the electric power supplying device 37 and the electric motors m1 and m2 heat up.

The timer 33 referred to above starts its counting operation upon start of the discharge mode. When based on the count of the timer 33, the CPU 31 determines that a predetermined length of time has passed, the machine control device 34 initiates a closing operation of the gates 5i and 8i in the fully opened position, according to a closing condition as will be described later. The period up until the start of the closing operation of the gates 5i and 8i is set to, for example, one hour and, accordingly, when the length of time counted by the timer 33 exceeds one hour, the closing operation of the gate 5i and 8i is initiated.

On the other hand, in the event that based on the temperature signal fed from the temperature detector 38, the temperature of the electric power supplying device 37 exceeds a predetermined threshold during the discharge mode, the CPU 31 causes the machine control device 34 to initiate the closing operation of the gates 5i and 8i according to the closing condition as will be described later. It is to be noted that the threshold of the temperature referred to above is stored in the memory 32 and is set to, for example, 70°, and, accordingly, when the temperature of the electric power supplying device 37 exceeds 70°, the closing operation of the gates 5i and 8i is initiated.

First Sound Source

During the weighing mode, the machine control device 34 outputs a drive signal (pulse signal) which will become the rotation command, so that the electric motor m1 and m2 can be driven at a speed at which those motors m1 and m2 can rotate smoothly. Since the motors m1 and m2 are substantially continuously rotated smoothly at such speed to close the gates 5i and 8i, no sound as will be described later is generated.

On the other hand, during the discharge mode, the machine control device 34 outputs an intermittent drive signal (pulse signal) with which the electric motors m1 and m2 are rotated at a low speed. With this signal, the output shafts 50 and 80 are intermittently rotated by the minute angle $\ddot{A}\grave{e}$ and, consequently, the gates 5i and 8i are intermittently rotated by an angle $\ddot{A}\acute{a}_j$ corresponding to the minute angle $\ddot{A}\grave{e}$ as shown by the double-dotted line in FIG. 3C.

Figure 4B:
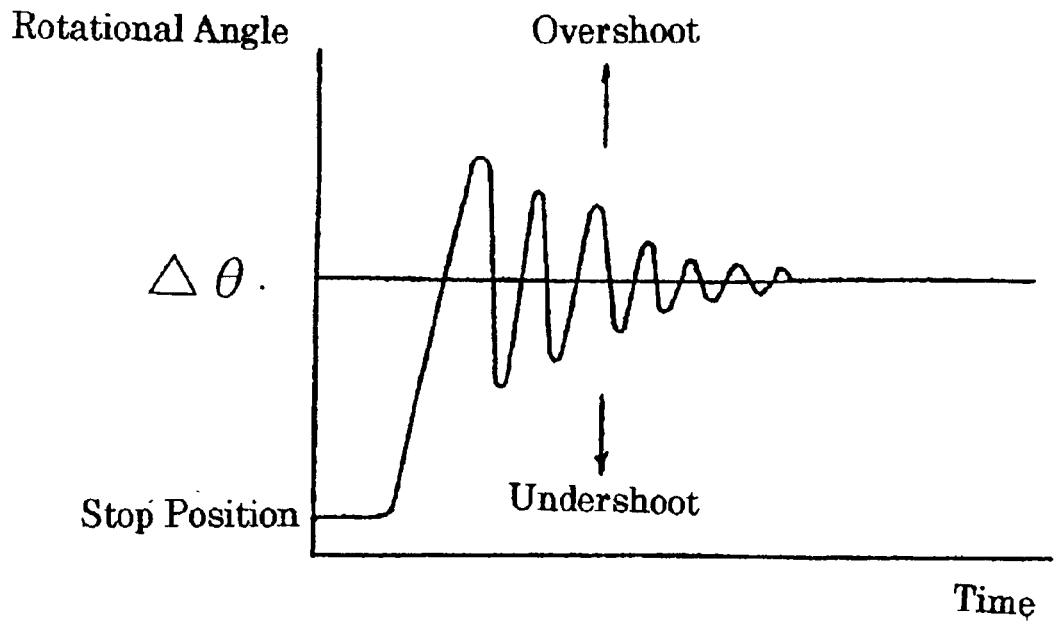
FIG. 4B is a graph showing a damped vibration of a motor.

When as shown in FIG. 4B the respective output shafts 50 and 80 of the electric motors m1 and m2 are rotated the minute angle $\ddot{A}\grave{e}$, the output shafts 50 and 80 develop a damped oscillation in which the output shafts 50 and 80 repeatedly undergo rotation over the minute angle $\ddot{A}\grave{e}$ (an overshoot) and rotation in a reverse direction (an undershoot). Because of this, it is suspected that when the electric motors m1 and m2 are driven at a sufficiently low rotational speed, the damped oscillation of the output shafts 50 and 80 that occurs repeatedly results in vibrations of the gates 5i and 8i, respectively, which are in turn amplified by an inertia of the gates 5i and 8i (hoppers 4i and 6i), finally resulting in generation of noisy sounds.

In other words, when before the gates are closed the gates 5i and 8i are intermittently moved a number of times, that is, when the speed of movement of the gates 5i and 8i is discontinuously varied during operation of the gates 5i and 8i, sounds are generated each time the gates are moved. Thus, the reason for generation of such sounds appears to result from the fact that when the average speed of rotation of the electric motors m1 and m2 during the discharge mode is sufficiently lower than that during the weighing mode, the electric motors m1 and m2 vibrate and the vibration of those electric motors m1 and m2 results in generation of vibrating sounds through the gates 5i and 8i. Those vibrating sounds are amplified by the hoppers 4i and 6i.

As discussed above, the electric motors m1 and m2, the gate switching mechanisms 54 and 84, the gates 5i and 8i and the hoppers 4i and 6i cooperate to generate sounds and, accordingly, constitute a first sound source.

Figure 3C:
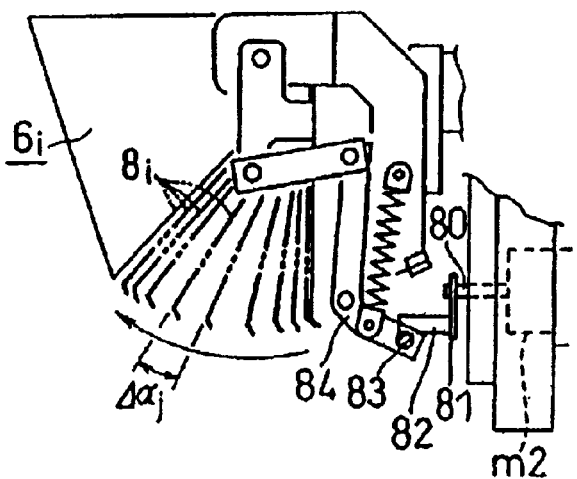
Figure 3D:
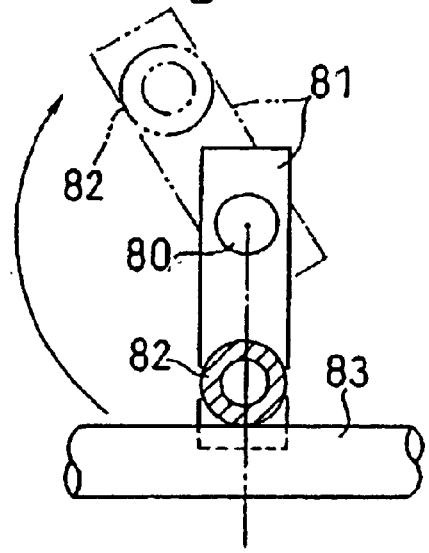
Figure 3E:
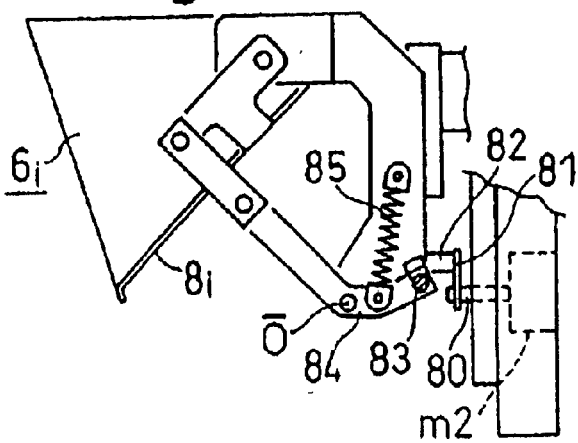
Figure 3F:
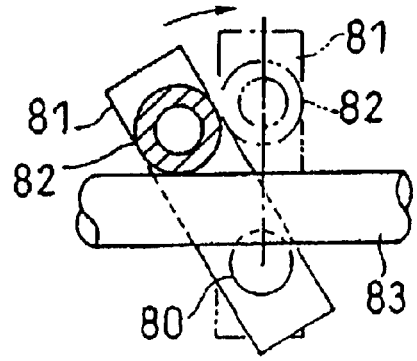

At the position shown by the double-dotted line in FIG. 3C at which the sounds are generated, the gates 5i and 8i are vibrating, but not rotating. Because of this, the average speed at which the gates 5i and 8i are closed during the discharge mode is lower than the average speed at which the gate 5i and 8i are closed during the weighing mode. Also, the length of time during which the gates 5i and 8i undergo the closing operation during the discharge mode is longer than the length of time during which the gates 5i and 8i undergo the closing operation during the weighing mode.

Referring to FIG. 5A, the memory 32 includes a parameter storage 32a. As shown in FIG. 5B, the parameter storage 32a is provided with a storage table storing driving parameters including the gate closing duration and rotational speeds of the electric motor for each of the weighing and discharge modes. The storage table corresponding to the weighing mode stores predetermined values. On the other hand, the storage table corresponding to the discharge mode stores driving parameters inputted by an operator as will be described later.

The touch interfacing screen 35 referred to hereinbefore is in the form of, for example, a liquid display unit and constitutes not only a display means for effecting various displays, but also an input setting instrument which when a screen thereof is touched various driving parameters can be inputted one at a time. This touch interfacing screen 35 displays, for example, a select menu or screen 40 and a gate closing duration setting menu 41 as shown in FIG. 6.

Driving Parameter Setting

Figure 6A:
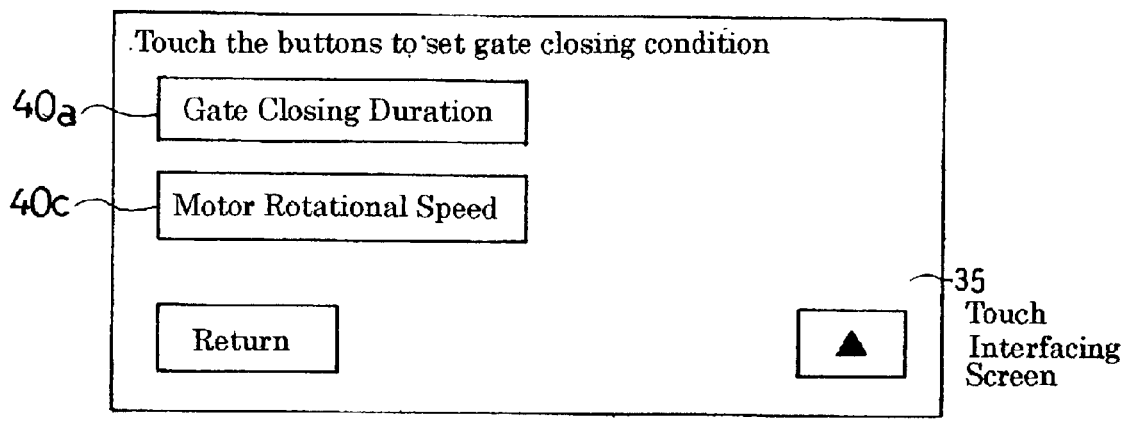
FIGS. 6A and 6B are explanatory diagrams showing different contents displayed on a display unit, respectively.

In the select menu 40 shown in FIG. 6A, a setting button 40a for setting the gate closing duration and a setting button 40c for setting the rotational speed of the electric motor are displayed. The setting buttons 40a and 40c are used to set parameters at the time the gates 5i and 8i then in the fully opened position are to be closed, the setting being performed in a manner which will be described subsequently.

Gate Closing Duration

Figure 6B:
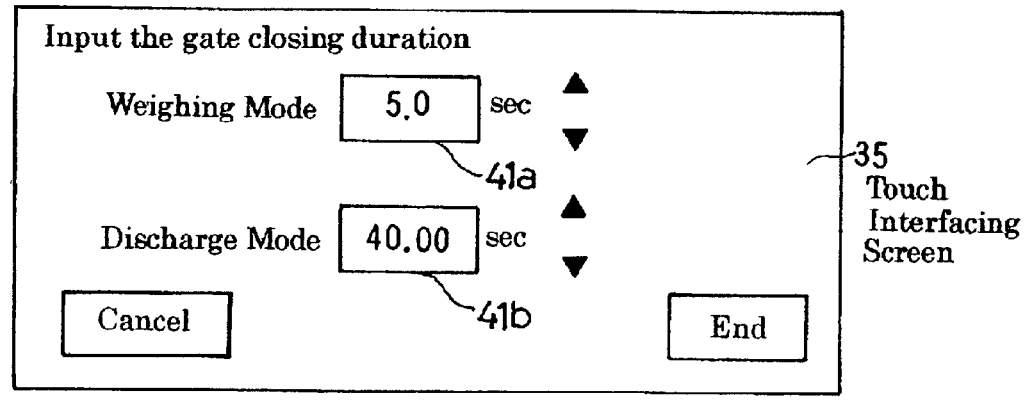

When the gate closing duration setting button 40a is touched, a gate closing duration setting submenu 41 as shown in FIG. 6B is displayed. This submenu 41 is for setting the gate closing duration that passes up until the gates 5i and 8i are completely closed, i.e., moved to the closed position from the fully opened position, and includes a closing time input areas 41a and 41b corresponding to the weighing and discharge modes, respectively.

When the operator inputs a predetermined value in the closing time input area 41b for the discharge mode, the CPU 31 causes such input value to be stored in the parameter storage 32a. The input value for the discharge mode is a value sufficiently greater than that for the weighing mode so that during the discharge mode sounds of vibration can be generated from the gates 5i and 8i and the pooling hoppers 4i and 6i that constitute the first sound source.

Motor Rotational Speed

When the motor rotational speed setting button 40c shown in FIG. 6A is touched, a predetermined setting submenu (not shown) is displayed. A value for the discharge mode is set to a value sufficiently smaller than that for the weighing mode so that during the discharge mode high sound of vibration can be generated from the first sound source.

It is to be noted that when one of the gate closing duration and the motor rotational speed is inputted, the other of the gate closing duration and the motor rotational speed is naturally determined and, therefore, it is sufficient for the operator to input one of the gate closing duration and the motor rotational speed.

Operation During Discharge Mode

The operation of the discharge mode will now be described with reference to the flowchart shown in FIG. 7.

In the first place, the operator performs a predetermined manipulation to cause the select menu 40 to be displayed on the touch interfacing screen 35 defining a select device, followed by setting a parameter indicating control patterns. When the operator touches the gate closing duration setting button 40a, the setting submenu 41 is displayed. When the operator subsequently performs a predetermined manipulation by inputting the closing duration for the discharge mode, the CPU 31 causes the closing duration to be stored in a relevant storage area of the parameter storage 32a.

Thereafter, when the necessity arises to perform the setup operation in which the articles being handled are changed from one kind to another or the cleansing after the apparatus has been run under the discharge mode, the operator has to perform a predetermined manipulation to set the CPU 31 in the discharge mode.

Upon start of the discharge mode, at step S1 the machine control device 34 causes the dispensing feeder 2 and the supply troughs 3i to drive and also supplies an electric power to the electric motors m1 and m2 to drive the respective gates 5i and 8i to the fully opened position so that the articles remaining within the supply troughs 3i and the hoppers 4i and 6i can be discharged out of the system through the hoppers 4i and 6i before the program flow goes to step S2.

At step S2, the timer 33 starts its counting operation simultaneously with the start of the discharge mode, followed by step S3 at which based on the count of the timer 33 the CPU 31 determines if a predetermined length of time has passed. If the CPU 31 determines that the predetermined length of time has passed, the program flow goes to step S5, but if the CPU 31 determines that the predetermined length of time has not yet passed, the program flow goes to step S4.

If at step S4 the CPU 31 determines, based on the temperature signal fed from the temperature detector 38, that the temperature of the electric power supplying device 37 exceeds a predetermined threshold value, the program flow goes to step S5. On the other hand, if the CPU 31 determines that the temperature of the electric power supplying device 37 is of a value lower than the predetermined threshold value, the program flow goes back to step S3. At step S5, the CPU 31 triggers the alarm 36 to cause the latter to issue a warning signal, followed by step S6.

At step S6 the CPU 31 reads out the predetermined parameter (the gate closing duration that has been set as hereinbefore described) from the parameter storage 32a and, in accordance with the predetermined parameter so read, the machine control device 34 causes the gates 5i and 8i to undergo the closing operation. At this time, the gates 5i and 8i are intermittently moved towards the completely closed position and, at the same time, sounds are generated from the hoppers 4i and 6i and the gates 5i and 8i that constitute the first sound source.

As hereinabove described, during the discharge mode, since the gates are closed in dependence on the length of time during which the gates 5i and 8i are opened and the temperature of the electric power supplying device 37, undesirable damages caused by the elevated temperature of the electric motors that occurs when the gates 5i and 8i are kept in the opened position can be avoided. Also, since the alarm 36 is triggered on to issue the warning prior to the gates 5i and 8i starting their closing operation, the operator can be warned upon closure of the gates.

In addition, while the gate closing operation takes place during the discharge mode, the gates 5i and 8i are intermittently rotated, accompanied by generation of sounds and, therefore, the operator can be cautioned. Because of this, it is possible to prevent the operator from being taken aback during the movement of the gates 5i and 8i. Yet, the possibility is minimized for the operator to be taken aback since the gates 5i and 8i move slowly towards the fully closed position.

n the meantime, the gates 5i and 8i are such that the speed of movement of the gates 5i and 8i then undergoing the closing operation is higher during their movement than that at the time of start and termination of movement of the gates 5i and 8i. Because of this, the sound is bigger during the movement of the gates 5i and 8i than that at the time of start and termination of movement of the gates 5i and 8i, the operator can be further cautioned.

In addition, a cause of damages to the machine in the conventional combination weighing apparatus is in most case attributable to increase of the temperature and, therefore, since by measuring the temperature of the machine which is a direct cause, the closing operation is carried out based on the temperature so measured, a meritorious effect can be obtained in avoiding damages to the machine and equipments.

It is to be noted that by changing the magnitude and cycle of vibrations of the first sound source the interval of sounds generated and the volume thereof may preferably be adjusted finely to minimize the possibility of obnoxious sounds being generated.

Also, arrangement may be made so that the value of the driving parameter for the discharge mode, which can be used as a reference, can be displayed beforehand in the input submenu such as the closing duration setting submenu 41.

Yet, where no control signal is inputted for a substantial length of time, the supply of the electric power may be interrupted.

Second Embodiment

Figure 8:
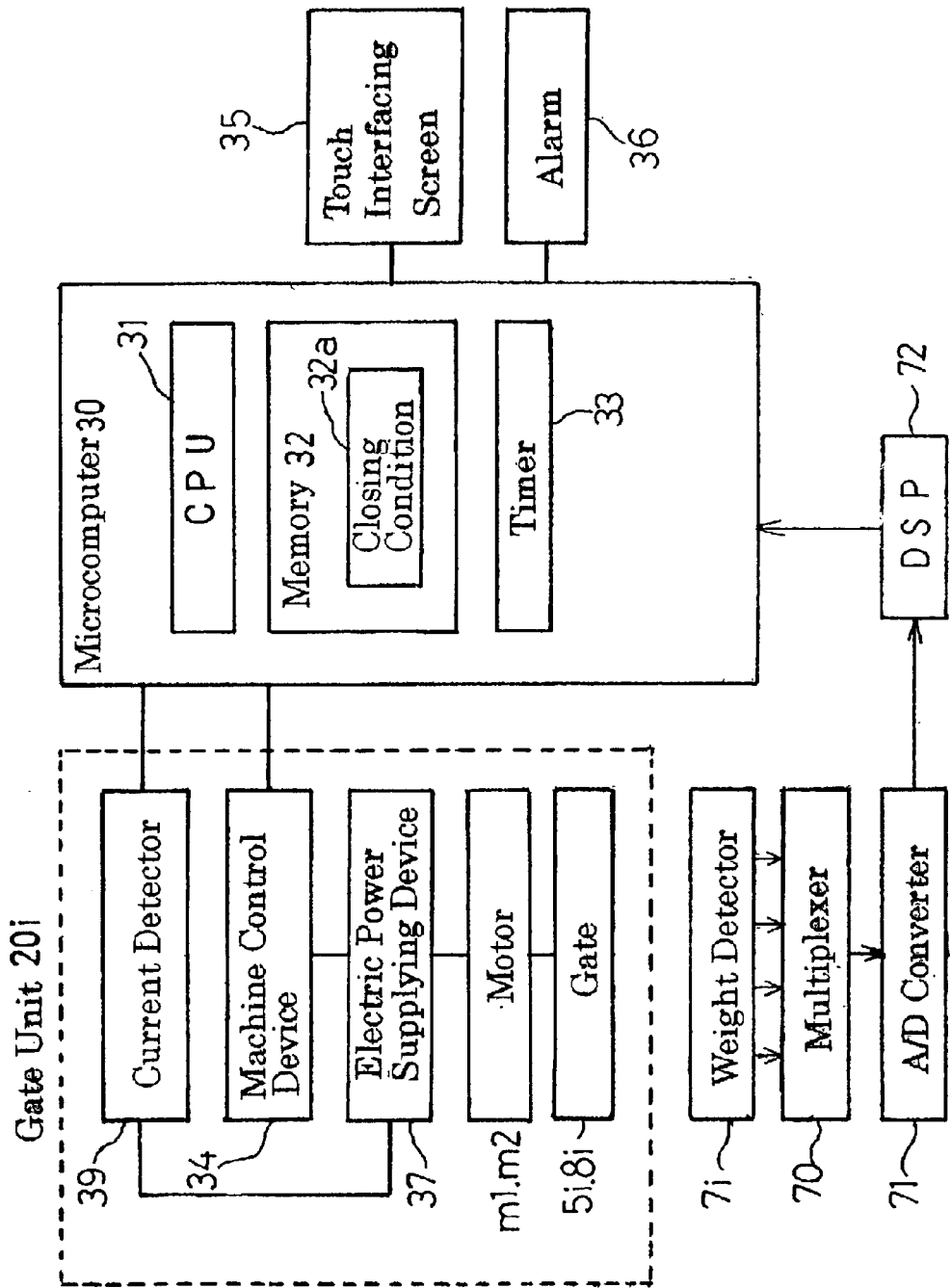
FIG. 8 is a conceptual diagram showing the function of a combination weighing apparatus according to a second preferred embodiment of the present invention.

FIG. 8 illustrates a second embodiment of the present invention.

In this second embodiment, unlike the first embodiment described previously, in place of the temperature detector, a current detector 39 (a further example of the detecting devices) is connected with the individual electric power supplying device 37. The current detector 39 is operable to detect a driving current value of the electric power supplying device 37 and then to supply it to the microcomputer 30 and the CPU 31 calculates a cumulative value of the driving current by integrating the driving current value.

Other structural features are substantially similar to those in the first embodiment and similar component parts are designated by like reference numerals while detailed description and drawings thereof are omitted for the sake of brevity.

The CPU 31 during the discharge mode compares, after the gates 5i and 8i have been fully opened, the cumulative value of the driving current with a predetermined threshold value and initiates the closing operation of the gates 5i and 8i in the event that the cumulative value of the driving current exceeds the predetermined threshold value. In other words, in place of time employed for determination, the CPU 31 of the second embodiment compares the cumulative value of the current with the threshold value for determination.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, the temperature sensor may be provided in a primary electric power source of the combination weighing apparatus so that the closing operation can be initiated in response to increase of the temperature of the primary electric power source. Also, a current detector may be provided in the primary electric power source of the combination weighing apparatus so that the closing operation can be initiated based on an integrated current of the primary electric power source.

Also, prior to the closing operation of the gates 5i and 8i during the discharge mode, the gates 5i and 8i may be caused to perform a reciprocating movement by means of the machine control device 34. For example, in place of the alarm 36 being triggered on to announce the start of the closing operation, the gates 5i and 8i may be reciprocatingly moved between a half closed position and the fully opened position to provide the precautions announcement. In other words, prior to the closing operation of the gates 5i and 8i, the machine control device 34 repeatedly alternately performs an opening control for moving the gates 5i and 8i towards the opened position and a closing control for moving the gates 5i and 8i towards the closed position to thereby provide a warning to the operator.

In addition, the sounds may be generated by causing the gates 5i and 8i to reciprocate during the closing operation thereof. By way of example, as shown in FIG. 9A, sounds may be generated by repeating a 9° closing operation and a 4.5° opening operation, increasing the angle of rotation Äè1 of the gate 8i during the closing control to a value greater than the angle of rotation Äès of the gate 8i during the opening control and allowing the speed of movement of the gates to be equal to that during the weighing operation. In other words, the sounds are generated by intentionally pulling the motor m1 and m2 out of synchronism. In such case, as shown in FIG. 9B, arrangement may be made so that the angles of rotation Äè1 and Äès can be set.

Rotational angle input areas 42a and 42b for the electric motors m1 and m2 at the time of closing of the motors m1 and m2 during the discharge mode are presented on a rotational angle setting submenu 42. It is to be noted that when the operator inputs a predetermined value in the input area 42b for the discharge mode, the CPU 31 causes the input value to be stored in the parameter storage 32a.

Yet, for the electric motors, other than the stepper motor, an AC servo motor or a DC motor, for example, may be employed.

Furthermore, arrangement may be made so that the speed of movement of the gate can be set through an input setting device.

In addition, arrangement may be made so that by dividing the plural hoppers into a number of groups and storing them in the memory, the driving parameter or the control pattern for each of the groups can be set.

Although in the foregoing embodiments reference has been made to the combination weighing apparatus provided with the hoppers around the dispensing feeder, the present invention is not intended to limit a particular arrangement of the hoppers and can be equally applied to a combination weighing apparatus wherein the hoppers are arranged in a straight row. Also, the pooling hoppers referred to herein may not be always necessary and the provision of only the weighing hoppers is sufficient.

Also, in place of the alarm, a voice guidance of, for example, "Be cautious of the gates being closed." may be outputted so that the operator can be warned with no precautions warning, or the voice guidance may be carried out in combination with the alarm.

While each of the machine control device 34 and the electric power supplying device 37 may be employed for one of the electric motors m1 and m2, the machine control device 34 and the electric power supplying device 37 may be employed for each of the electric motors m1 and m2. In such case, the temperature detector 38 and the current detector 39 have to be employed for each of the electric power supplying devices 37.

Accordingly, such changes and modifications are, unless they depart from the scope of the present invention as delivered from the claims annexed hereto, to be construed as included therein.

What is claimed is:

1. A combination weighing apparatus which comprises:
   a plurality of hoppers each having a gate, each of said hoppers being capable of accommodating an article and discharging the article therefrom upon opening of the respective gate;
   a drive device for selectively opening and closing the gate and maintaining the gate in an opened position when in a conducting state; and
   a control device for controlling the drive device and having a weighing mode, in which the gates of the hoppers selected for combination are opened to combine the respective articles, and a discharge mode in which the articles within the hoppers are discharged while the gates are maintained in the opened position;
   wherein when during the discharge mode a condition of at least one of the drive device, an electric power supplying device for supplying an electric power to the drive device and the gate reaches a setting level, said control device drives the drive device to control the gate to close.

2. The combination weighing apparatus as claimed in claim 1, further comprising a detecting device for detecting a driving condition of the drive device when the gate is opened; and
   wherein when a detected value detected by the detecting device during the discharge mode attains a predetermined value, said control device drives the drive device to control the gate to close.

3. The combination weighing apparatus as claimed in claim 1, wherein when an opened condition of the gate continues for a predetermined length of time during the discharge mode, said control device controls the gate to close.

4. The combination weighing apparatus as claimed in claim 1, wherein when during the discharge mode in which the gate is in the opened position a temperature of the electric power supplying device for maintaining the gate in the opened position as a result of the conduction attains a predetermined temperature, said control device controls the gate to close.

5. The combination weighing apparatus as claimed in claim 1, wherein when during the discharge mode in which the gate is in the opened position a cumulative value of a driving current or an electric power of the electric power supplying device for maintaining the gate in the opened position as a result of the conduction attains a predetermined value, said control device controls the gate to close.

6. The combination weighing apparatus as claimed in claim 1, further comprising a sound source for generating sounds; and
   wherein during the discharge mode, prior to initiation of a closing operation of the gate and/or during a closing operation thereof, the sounds are generated by the sound source.

7. The combination weighing apparatus as claimed in claim 1, wherein during the discharge mode, prior to initiation of a closing operation of the gate and/or during a closing operation thereof, the gate is reciprocatingly moved by the control device a smaller quantity of movement than that during the weighing mode.

8. The combination weighing apparatus as claimed in claim 1, wherein said control device adjusts an average speed of closing of the gate during the discharge mode to a value lower than an average speed of closing of the gate during the weighing mode.

9. A combination weighing apparatus which comprises:
   a plurality of hoppers each having a gate, each of said hoppers being capable of accommodating an article and discharging the article therefrom upon opening of the respective gate;
   a drive device for selectively opening and closing the gate and maintaining the gate in an opened position when in a conducting state; and
   a control device for controlling the drive device and having a weighing mode, in which the gates of the hoppers selected for combination are opened to combine the respective articles, and a discharge mode in which the articles within the hoppers are discharged while the gates are maintained in the opened position;
   wherein said control device performs a control of setting a closing duration of the gate during the discharge mode to a value longer than a closing duration of the gate during the weighing mode.

10. The combination weighing apparatus as claimed in claim 9, wherein said control device causes the gate to be intermittently moved a number of times during the discharge mode to cause the gate to undergo a closing operation; and
   sounds are generated from the gate each time the gate is intermittently moved.

11. The combination weighing apparatus as claimed in claim 9, wherein said control device repeats an operation which discontinuously varies a speed of movement of the gate, undergoing an closing operation of the gate during the discharge mode; and
   sounds are generated each time the speed of movement of the gate varies discontinuously.

12. The combination weighing apparatus as claimed in claim 9, wherein a drive source for the drive device is a drive source for driving by rotation; and
   said control device causes the drive source to vibrate by setting a speed of rotation of the drive source during the discharge mode to a value lower than the speed of rotation of the drive source during the weighing mode, said vibration being transmitted to the gate to vibrate the gate to thereby generate sounds.

13. The combination weighing apparatus as claimed in claim 9, wherein a drive source for the drive device is a drive source for driving by rotation; and
   said control device causes the drive source to vibrate by repeatedly alternately performing an opening operation for moving the gate towards an opened position and a closing operation for moving the gate towards a closed position, and also by setting an angle of rotation of the drive source during the closing operation to a value greater than the angle of rotation of the drive source during the opening operation, said vibration being transmitted to the gate to vibrate the gate to thereby generate sounds.

14. The combination weighing apparatus as claimed in claim 9, wherein by causing a speed of movement of the gate during the closing operation to be higher during movement thereof than that at the time of termination of movement of the gate, the sound generated during the movement of the gate is bigger than that at the time of termination of the movement of the gate.

15. The combination weighing apparatus as claimed in claim 9, wherein said control device causes, at the time of the gate closing operation during the discharge mode, the gate to undergo a reciprocating movement in a quantity smaller than that during the weighing mode.

16. The combination weighing apparatus as claimed in claim 9, further comprising an input setting device for enabling at least one of driving parameters including a closing duration of the gate during the discharge mode, a speed of rotation of the drive source and the angle of rotation of the drive source to be inputted.

17. The combination weighing apparatus as claimed in claim 9, further comprising a select device for setting control patterns of at least two of a control of the gate closing duration by the control device during the discharge mode, a control of a speed of rotation of the drive source, a control of an angle of rotation of the drive source and a control of a speed of movement of the gate, and for selecting one of the plural control patterns.

18. The combination weighing apparatus as claimed in claim 16, wherein the plural hoppers are divided into a plurality of groups that is to be stored and wherein the driving parameter or the control pattern for each of the groups can be set.

19. The combination weighing apparatus as claimed in claim 17, wherein the plural hoppers are divided into a plurality of groups that is to be stored and wherein the driving parameter or the control pattern for each of the groups can be set.

* * * * *